United States Patent [19]

Park

[11] Patent Number: 5,561,464
[45] Date of Patent: Oct. 1, 1996

[54] METHOD AND APPARATUS FOR ENCODING A VIDEO SIGNAL EMPLOYING TRANSFORM AND CLASSIFIED VECTOR QUANTIZATION TECHNIQUES

[75] Inventor: Hak-Jae Park, Incheon, Rep. of Korea

[73] Assignee: Daewoo Electronics Co., Ltd., Seoul, Rep. of Korea

[21] Appl. No.: 433,270

[22] Filed: May 2, 1995

[30] Foreign Application Priority Data

Mar. 20, 1995 [KR] Rep. of Korea .......................... 95-5867

[51] Int. Cl.⁶ ....................................................... H04N 7/26
[52] U.S. Cl. ............................................ 348/397; 348/398
[58] Field of Search ..................................... 348/398, 403, 348/408, 404, 420, 421, 437, 438; H04N 7/13, 7/26

[56] References Cited

U.S. PATENT DOCUMENTS

| | | | |
|---|---|---|---|
| 5,128,757 | 7/1992 | Citta et al. | 348/398 |
| 5,339,164 | 8/1994 | Lim | 348/441 |
| 5,420,636 | 5/1995 | Kojima | 348/403 |
| 5,442,399 | 8/1995 | Asamura et al. | 348/398 |

Primary Examiner—Victor R. Kostak
Attorney, Agent, or Firm—Anderson Kill Olick & Oshinsky, P.C.

[57] ABSTRACT

A novel apparatus for improving the overall compression efficiency comprises: a transformer for transforming an input video signal into a plurality of subbands of transform coefficients, wherein one subband which exists in the lowest frequency band includes one or more DC coefficients, the remaining subbands contain a multiplicity of AC coefficients, respectively; a converter for converting the transform coefficients included in the plurality of subbands into a number of assembled blocks with a predetermined identical size, each of the blocks having one DC coefficient and a plurality of AC coefficients; a generator for generating a selection signal representing a class for each of the assembled blocks; first encoder for encoding the DC coefficients of the assembled blocks, to thereby generate a first encoded video signal; a second encoder, responsive to the selection signal, and for encoding the AC coefficients of each of the assembled blocks, to thereby produce a second encoded video signal; and a formatter for formatting the first encoded video frame signal and the second encoded video frame signal.

2 Claims, 4 Drawing Sheets

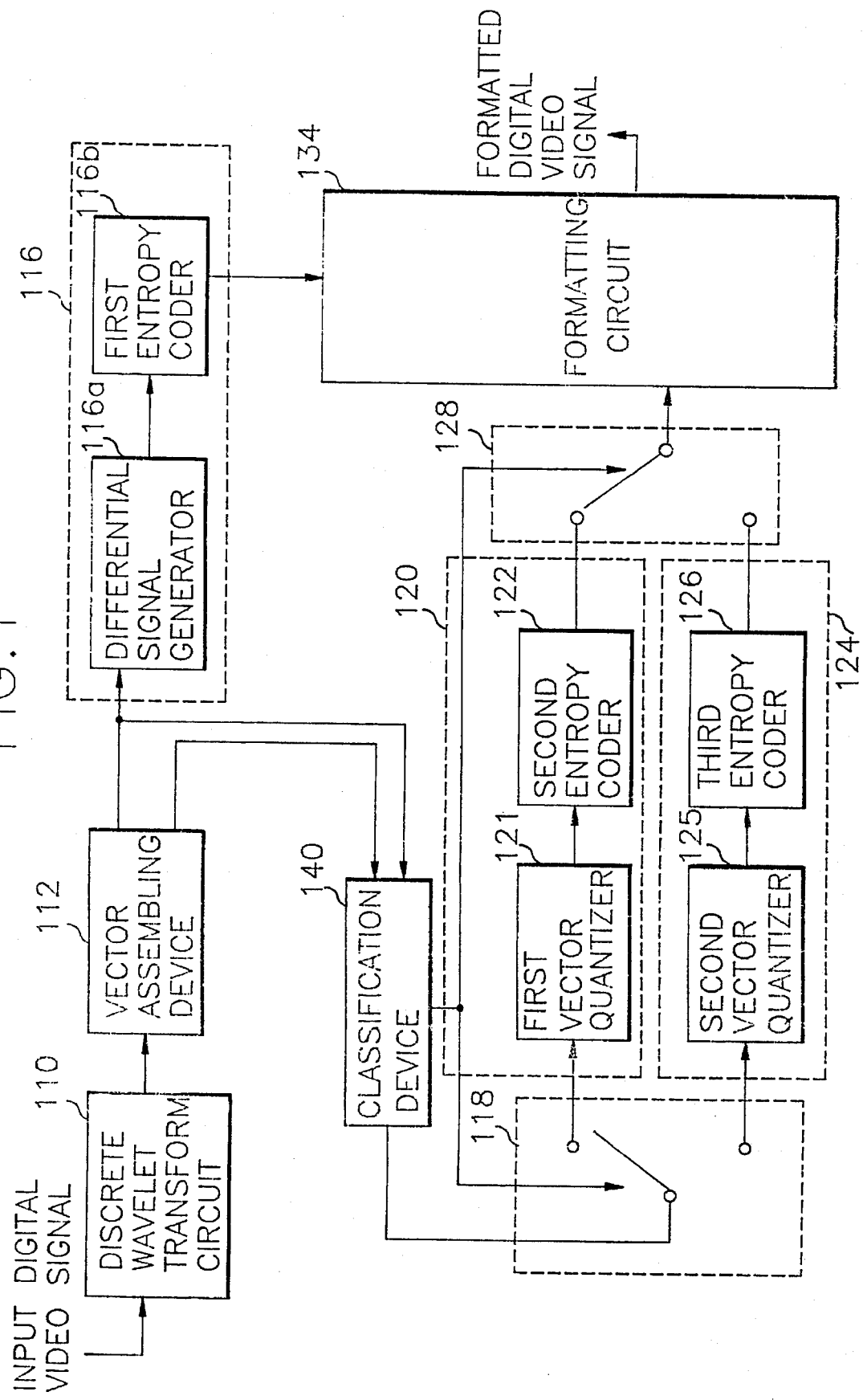

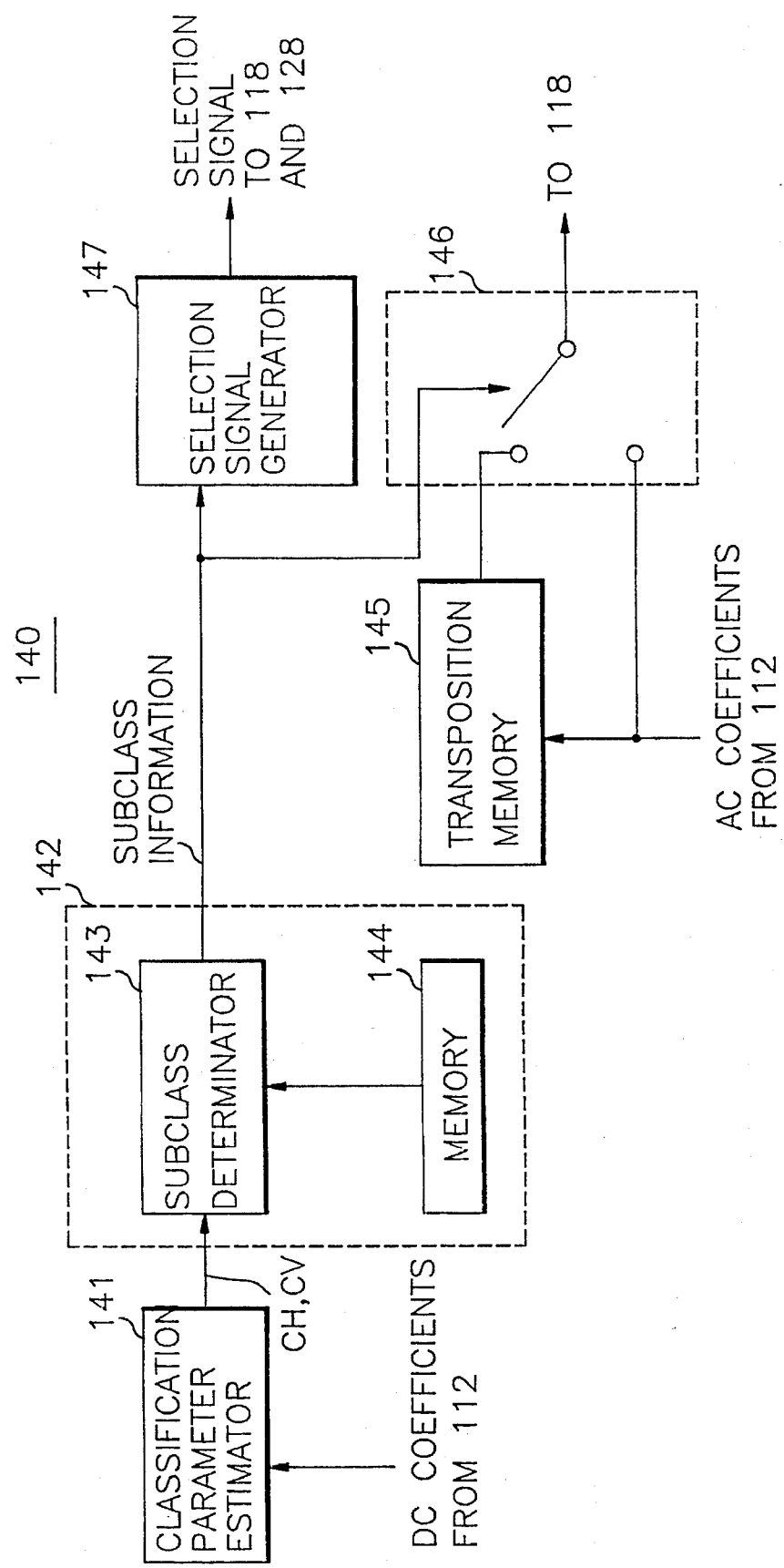

FIG.3A    FIG.3B    FIG.3C
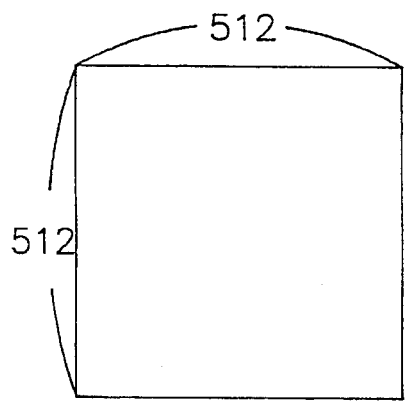
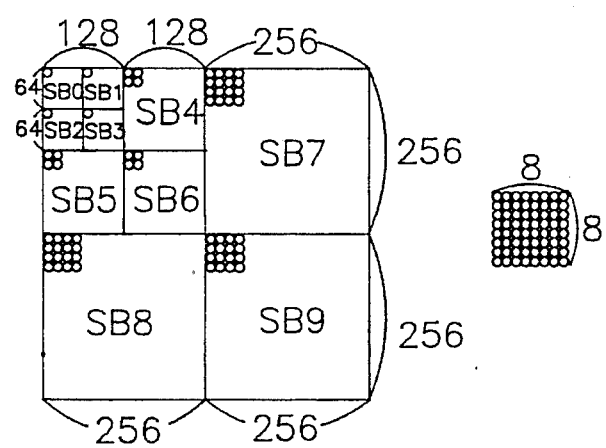
FIG.3D
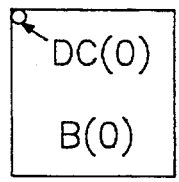 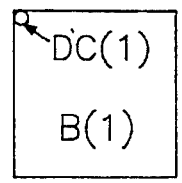 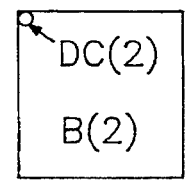 . . .
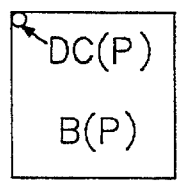 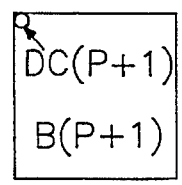 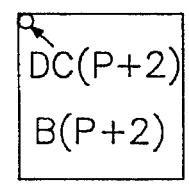 . . .
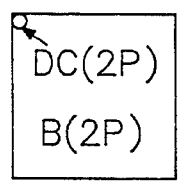 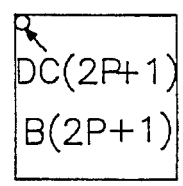 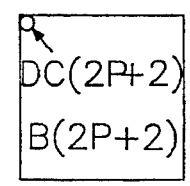 . . .

METHOD AND APPARATUS FOR ENCODING A VIDEO SIGNAL EMPLOYING TRANSFORM AND CLASSIFIED VECTOR QUANTIZATION TECHNIQUES

FIELD OF THE INVENTION

The present invention relates to a video signal encoding system; and, more particularly, to a method and apparatus for encoding a video signal by using transform and classified vector quantization techniques without having to transmit the class information of the video signal.

DESCRIPTION OF THE PRIOR ART

In various electronic/electrical applications such as high definition television and video telephone system, a video signal may need be transmitted in a digitized form. When the video signal comprising a sequence of video "frame" is expressed in a digitized form, there is bound to occur a substantial amount of digital data, wherein each line of a video frame is defined by a sequence of digital data elements referred to as "pixels". Since, however, the available frequency bandwidth of a conventional transmission channel is limited, in order to transmit the substantial amount of digital data through the channel, the use of a video signal encoding system may become necessary to compress or reduce the volume of the data to be transmitted.

The video signal can be normally compressed without seriously affecting its integrity because there usually exist certain correlationships or redundancies among some of the pixels in a single frame and also among those of neighboring frames.

A fundamental goal of data compression is to reduce the bit rate of transmission while maintaining an acceptable image quality. Numerous data compression techniques have been developed, such as differential pulse code modulation-(DPCM), statistical or entropy coding, transform coding(TC), quantization, and adaptive versions of these techniques depending on applications. In the DPCM, data compression is accomplished by coding a difference between a sample and its prediction. The entropy coding does it by taking advantage of statistical redundancies among the input data.

The TC technique, which reduces or removes spatial redundancies between image data, converts the digital image data into a set of transform coefficient data. One of the most frequently used TC techniques for image data compression is a DCT(discrete cosine transform) based block transformation coding, which converts a block of digital image data, for example, a block of 8×8 pixels, into a set of transform coefficient data. This technique is described in Chen and Pratt, "Scene Adaptive Coder", *IEEE Transactions on Communication*, COM-32, No. 3, pp. 225–232 (March 1984). One of drawbacks of the block transform coding is the appearance of an annoying artifact, i.e., the so-called blocking effect, especially at low bit rates.

A DWT(discrete wavelet transform) has recently emerged as a powerful technique for low bit rate image compression-(see Olivier Rioul et al., "Wavelets and Signal Processing", *IEEE SP MAGINE*, pp. 14–38 (October, 1991)). The DWT is essentially a hierarchical subband coding technique and, therefore, does not show the blocking effect, wherein image data is decomposed into a plurality of subbands.

According to Shannon's rate-distortion theory, a better performance of data compression is expected from vector quantization rather than scalar quantization. Especially, classified vector quantization(CVQ) at very low bit rates improves coding efficiency and reduces edge distortion compared to non-classified vector quantization(see Nasser M. Nasrabadi et al., "Image Coding Using Vector Quantization: A Review", *IEEE Transactions on Communications*, 36, No. 8, pp. 957–971 (August, 1988)).

In an image encoding system employing the CVQ, an input vector is first classified into one of a plurality of classes and a corresponding codebook is determined; a representative vector, i.e., a candidate vector which best matches the input vector, is selected from the codebook; and class information representing the class for the input vector and a codeword index of the representative vector are coded by using, e.g., VLC(variable length coding) for the transmission thereof.

Among various coding schemes which combine the transform coding and the vector quantization coding techniques for low bit rate image compression, a classified wavelet transform/vector quantization technique, disclosed in Y. Huh et al., "Classified Wavelet Transform Coding of Images Using Vector Quantization", *SPIE*, 2308, pp. 207–213 (September, 1994), exploits the significant amount of residual redundancies among the subbands or layers, and improves the coding efficiency by taking advantage of the DWT and the CVQ. In this scheme, DWT coefficients are rearranged to form a number of input vectors, wherein each input vector is comprised of corresponding DWT coefficients from all of the subbands. Each input vector is classified into four classes depending on the directional activities of the coefficients included therein and then coded using its own codebook.

In the scheme described above, overhead information for representing the classes has to be transmitted together with the encoded image signal to a decoder for the reconstruction of the image, thereby lowering deteriorate the overall encoding efficiency.

SUMMARY OF THE INVENTION

It is, therefore, a primary object of the invention to provide an improved video signal encoding method and apparatus for encoding a video signal by using transform and classified vector quantization techniques without having to transmit the class information of the video signal, thereby improving the overall coding efficiency of the system.

In accordance with one aspect of the present invention, there is provided a method for encoding an input video signal, comprising the steps of:

transforming the input video signal into a plurality of subbands of transform coefficients, wherein one of subbands existing in the lowest frequency band includes one or more DC coefficients, and the remainder of the subbands includes a multiplicity of AC coefficients, respectively;

converting the transform coefficients included in the plurality off subbands into a number of assembled blocks with a predetermined identical size, each of the assembled blocks having one DC coefficient and a plurality of AC coefficients;

generating a selection signal representing a class for each of the assembled blocks;

encoding the DC coefficients in the assembled blocks, to thereby generate a first encoded video signal;

encoding the AC coefficients in each of the assembled blocks in response to the selection signal, to thereby produce a second encoded video signal; and formatting the first and the second encoded video signals.

In accordance with another aspect of the present invention, there is provided an apparatus for encoding an input video signal, which comprises:

means for transforming the input video signal into a plurality of subbands of transform coefficients, wherein one of the subbands existing in the lowest frequency band includes one or more DC coefficients, and the remainder of the subbands contain a multiplicity of AC coefficients, respectively;

means for converting the transform coefficients included in the plurality of subbands into a number of assembled blocks with a predetermined identical size, each of the assembled blocks having one DC coefficient and a plurality of AC coefficients;

means for generating a selection signal representing a class for each of the assembled blocks;

first encoding means for encoding the DC coefficients in the assembled blocks, to thereby generate a first encoded video signal;

second encoding means, responsive to the selection signal, for encoding the AC coefficients in each of the assembled blocks, to thereby produce a second encoded video signal; and means for formatting the first and the second encoded video signals.

BRIEF DESCRIPTION OF THE DRAWINGS

The above and other objects and features of the present invention will become, apparent from the following description of preferred embodiments given in conjunction with the accompanying drawings, in which:

FIG. 1 shows a block diagram of a video signal encoding apparatus including a classification device of the present invention;

FIG. 2 represents a detailed block diagram of the classification device shown in FIG. 1;

FIGS. 3A to 3D depict a block rearrangement procedure for classified vector quantization.

DETAILED DESCRIPTION OF THE PREFERRED EMBODIMENTS

Figure 4:
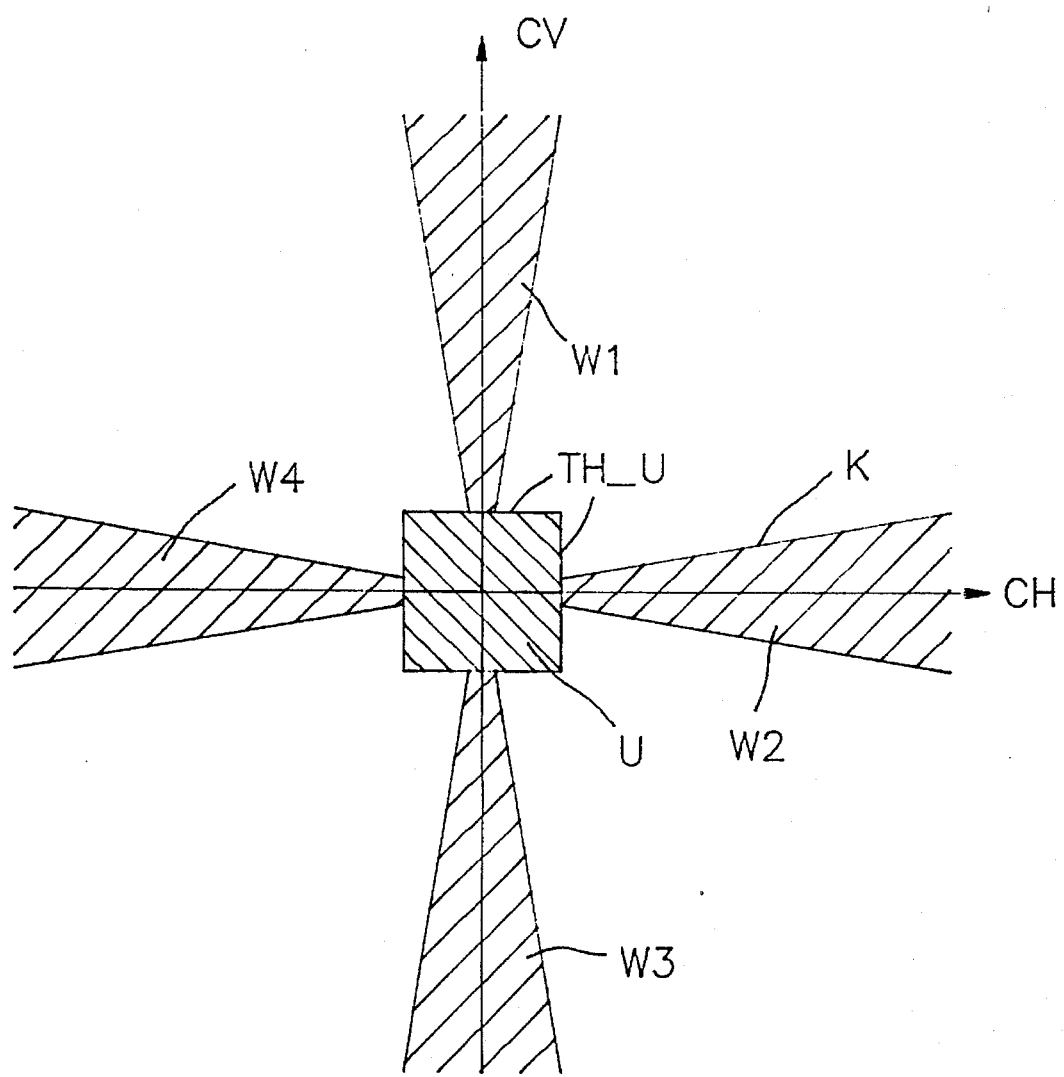
FIG. 4 illustrates a diagram for explaining the procedure for determining classes at the classification device.

Referring to FIG. 1, there is shown a novel video signal encoding apparatus having a classification device 140 of the present invention.

The video signal encoding system comprises a discrete wavelet transform(DWT) circuit 110, a vector assembling device 112, first, second and third video signal encoding units 116, 120 and 124, first and second switching circuits 118 and 128, a formatting circuit 134 and the classification device 140.

A digital video signal of an input image is applied to the DWT circuit 110 which serves to transform pixel data of the input image from the spatial domain to the frequency domain to produce a multiplicity of decomposed subbands. In case the image comprises N×N, e.g., 512×512, pixels as shown in FIG. 3A and the decomposition level thereof is S, e.g., 3, it is transformed into ten decomposed subbands, i.e., SB0 to SB9, as illustrated in FIG. 3B by the DWT circuit 110. In this case, the number of DWT coefficients included in each subband ranges from 64×64 to 256×256 as shown in FIG. 3B. Further, the subband SB0, which resides in the lowest frequency band, contains 64×64 DC coefficients; and the remaining subbands, i.e., SB1 to SB9, include AC coefficients. The DWT coefficients included in the decomposed subbands are then supplied to the vector assembling device 112.

At the vector assembling device 112, the DWT coefficients from the DWT circuit 110 are rearranged to form assembled blocks or vectors as illustrated in FIG. 3D, wherein each block comprises M×M, e.g., 8×8, as shown in FIG. 3C DWT coefficients taken from all of the subbands as shown in FIG. 3B. In this case, each of the assembled blocks includes one DC coefficient and sixty three AC coefficients. It should be apparent to those skilled in the art that other transform techniques, e.g., discrete cosine transform technique, may be used to provide sets of transformation coefficients which correspond to the assembled blocks provided by the DWT.

Returning to FIG. 1, the DC coefficients included in the assembled blocks are processed separately from the AC coefficients thereof. That is to say, said each DC coefficient contained in each of the assembled blocks is provided to the first video signal encoding unit 116 and the classification device 140, while the AC coefficients thereof are fed to the classification device 140. The first video signal encoding unit 116 includes a differential signal generator 116a and a first entropy coder 116b.

At the differential signal generator 116a, the DC coefficients are coded by using the DPCM technique. That is, a DC coefficient DC(0) of a first block B(0), shown in FIG. 3D, provided from the vector assembling device 112 is first subtracted from a preset predictor to provide a differential value between DC(0) and the predictor, and the predictor is then updated to the value of the coefficient just coded, i.e., the DC coefficient of the block B(0). The DC coefficient DC(1) of a second block B(1) is then subtracted from the updated predictor and the predictor is updated to the value of the DC(1). This process is sequentially performed until all of the DC coefficients are processed. Thereafter, the differential values generated from the differential signal generator 116a are provided to the first entropy coder 116b which serves to encode the differential values by using, for example, a combination of run-length and variable length coding(VLC) to thereby provide an encoded DC signal to the formatting circuit 134.

In accordance with the present invention, the classification device 140 provides, for each assembled block, a selection signal, e.g., SC1, representing the class of an input vector to the first and the second switching circuits 118 and 128, and the input vector to the first switching circuit 118.

Turning now to FIG. 2, there is illustrated a detailed block diagram of the classification device 140 shown in FIG. 1. The classification device 140 comprises a class parameter estimator 141, a subclass determination unit 142, a transposition memory 145, a third switching circuit 146 and a selection signal generator 147.

The class parameter estimator 141 is adapted to estimate two horizontal and vertical class parameters, e.g., CH and CV, representing the activities of the DC coefficients in the horizontal and vertical directions. In accordance with a preferred embodiment of the present invention, the horizontal and vertical class parameters of a block are respectively determined based on the DC coefficients of the blocks along a row and a column on which the block is located. For instance, a horizontal class parameter CH(i) for an ith block included in the assembled blocks of the DWT coefficients as shown in FIG. 3D is derived as follows:

$$CH(i) = \sum_{j=-Q}^{Q} Aj * DC(i+j) \quad \text{Eq. (1)}$$

wherein Aj's are predetermined weight factors; Q being a predetermined positive integer with a maximum window size of (2Q+1); DC(i+j), DC coefficient of (i+j)th block, and the DC coefficients of the blocks which are not located on the same row of the ith block B(i) are set to zero.

Similarly, a vertical class parameter CV(i) is determined as:

$$CV(i) = \sum_{j=-Q}^{Q} Bj * DC(i+P*j) \quad \text{Eq. (2)}$$

wherein Bj's are predetermined weight factors and other terms have the same meanings as given in Eq.(1).

As may be seen from Eqs. (1) and (2), each of the two horizontal and vertical class parameters CH(i) and CV(i) can be derived by utilizing, e.g., conventional band pass filters well known in the art, respectively. Subsequently, the horizontal and the vertical class parameters CH's and CV's derived at the class parameter estimator 141 are provided to the class determination unit 142 which includes a subclass determinator 143 and a memory 144.

The subclass determinator 143 determines the subclass for each block based on the horizontal and the vertical class parameters thereof, provided from the class parameter estimator 141 and a predetermined threshold value and a slope factor, i.e., TH_U and K, retrieved from the memory 144, and generates subclass information which represents the determined subclass, i.e., one selected from uniform, horizontal, vertical and texture subclasses.

In the preferred embodiment of the present invention, if the horizontal and the vertical class parameters CH(i) and CV(i) exist within a threshold region U illustrated in FIG. 4, i.e., |CH(i)| and |CV(i)| are not larger than the threshold value TH_U, the ith block B(i) is determined to be of a uniform subclass; and if the horizontal and the vertical class parameters are in a region W1 or W3, i.e., |CH(i)/CV(i)| is equal to or smaller than the slope factor K, it is decided as of a vertical subclass wherein TH_U and K are positive numbers. And, if the horizontal and the vertical class parameters CH(i) and CV(i) exist in a region W2 or W4, i.e., |CV(i)/CH(i)| is not larger than K, the block is determined as of a horizontal subclass; and, otherwise, it is decided as of a texture class.

It should be appreciated that the predetermined threshold value and the slope factors TH_U and K prestored in the memory 144 can be determined based on the image types and the number of training vectors employed in determining two predetermined codebooks prestored within the second and the third video signal encoding units 120 and 124 which will be described with reference to FIG. 1 hereafter.

The subclass information generated at the subclass determinator 143 is provided to the third switching circuit 146 and the selection signal generator 147.

The transposition memory 145 serves to transpose each block of, e.g., 63, AC coefficients from the vector assembling device 112. In other words, an AC coefficient located at the kth column and the rth row within the block is stored at a storage position of the transposition memory 145 which corresponds to the rth column and the kth row of the block. In accordance with the present invention, the transposition of a block corresponding to the vertical subclass is carried out based on the fact that energy distribution characteristics of the coefficients in the transposed blocks are similar to those corresponding to the horizontal subclass. By transposing the blocks which belong to the vertical subclass, the size of a codebook for quantizing the blocks of vertical and horizontal subclasses can be minimized. The AC coefficients from the vector assembling device 112 shown in FIG. 1 and the transposed AC coefficients of the block from the transposition memory 145 are simultaneously provided to the third switching circuit 146.

The third switching circuit 146 selectively couples either the block of transposed AC coefficients from the transposition memory 145 or the block of AC coefficients from the vector assembling device 112 to the first switching circuit 118 shown in FIG. 1, in response to the subclass information from the subclass determinator 143. That is to say, if the input to the third switching circuit 146 is the class information representing the vertical subclass, the transposed AC coefficients from the transposition memory 145 are coupled to the first switching circuit 118; and if the input thereto is the subclass information representing one of the horizontal, uniform and texture classes, the AC coefficients from the vector assembling device 112 are coupled to the first switching circuit 118. The output from the third switching circuit 146, i.e., the transposed AC coefficients of a block corresponding to the vertical subclass or non-transposed AC coefficients in a block corresponding to one of the horizontal, uniform, and texture subclasses are fed to the first switching circuit 118 as an input vector.

In the meantime, the selection signal generator 147 classifies the four subclasses represented by the subclass information into, e.g., two classes, thereby providing the selection signal SC1 to be used for controlling the first and the second switching circuits 118 and 128 shown in FIG. 1.

In one of the preferred embodiments of the invention, the uniform, vertical and horizontal subclasses are classified as a local class as they have a localized energy distribution of the coefficients; and the texture subclass is classified as a random class since its energy is randomly distributed. In another preferred embodiment of the invention, the four subclasses can be classified into three classes, i.e., a local class for a uniform subclass, a directional class for the vertical and the horizontal subclasses, and a random class for the texture subclass. In the preferred embodiment of the present invention, the selection signal generator 147 generates, as the selection signal SC1, a logic high signal for the local class and a logic low signal for the random class. The selection signal SC1 is then fed to the first and the second switching circuits 118 and 128.

Referring back to FIG. 1, the first switching circuit 118 is responsive to the selection signal SC1 and selectively couples the corresponding input vector from the selection signal generator 147 shown in FIG. 2 to one of the second and the third video signal encoding units 120 and 124. That is, in response to the logic high selection signal SC1, the corresponding input vector is coupled to the second video signal encoding unit 120, which is adapted for quantizing input vectors corresponding to the local class; and, in response to the logic low selection signal, the corresponding input vector is coupled to the third video signal encoding unit 124, which is adapted for quantizing input vectors corresponding to the texture class.

The second video signal encoding unit 120 includes a first vector quantizer 121 and a second entropy coder 122. The first vector quantizer 121 is provided with a codebook which includes a set of predetermined candidate vectors and a corresponding set of codeword indices. At the first vector quantizer 121, each input vector is individually quantized or mapped into a most similar candidate vector, i.e., a representative vector, so as to minimize a mapping distortion, i.e., quantization error. Compression is achieved by using an index for each representative vector, i.e., a codeword index, instead of the vector itself, for the purpose of economy. Usually, the codebook is in the form of a lookup table and the quantization process is implemented as a table lookup operation. The codeword index for each input vector determined at the first vector quantizer 121 is fed to the second entropy coder 122.

The second entropy coder 122 is adapted to encode the codeword indices from the first vector quantizer 121 by employing, e.g., a combination of run-length and variable length coding to generate a local class AC signal. The local class AC signal generated at the second entropy coder 122 is then provided to the second switching circuit 128.

The third video signal encoding unit 124, which comprises a second vector quantizer 125 and a third entropy coder 126, processes each input vector which corresponds to the random class in a similar fashion as in the second video signal encoding unit 120, thereby providing the second switching circuit 128 with a random class AC signal. The third video signal encoding unit 124 is substantially identical to the second video signal encoding unit 120 except that a set of candidate vectors and variable length codes included therein are adapted to the input vectors of the random class.

The second switching circuit 128 selectively couples the local class AC signal and the random class AC signal to the formatting circuit 134 in response to the logic high and the logic low signals from the classification device 140.

The formatting circuit 134 serves to format the encoded DC signal from the first entropy coder 116b and the output signal for each input vector from the second switching circuit 128, to thereby provide a formatted digital video signal to a transmitter(not shown) for the transmission thereof.

As a result, a set of transform coefficients is quantized by using a classified vector quantization method without having to transmit the class information of an input vector to thereby improve the overall coding efficiency. At a receiving end, the class information is reconstructed from the transmitted DC coefficients. As may be seen from the above, the video signal decoding system may comprise a deformatting circuit, a plurality of entropy decoders, a plurality of inverse vector quantizers, an inverse vector assembling device and an inverse discrete wavelet transform circuit.

While the present invention has been shown and described with reference to the particular embodiments, it will be apparent to those skilled in the art that many changes and modifications may be made without departing from the spirit and scope of the invention as defined in the appended claims.

What is claimed is:

1. A method for encoding an input video signal, comprising the steps of:

transforming the input video signal into a plurality of subbands of transform coefficients by using a discrete wavelet transform, wherein one of the subbands existing in the lowest frequency band includes one or more DC coefficients and the remainder of the subbands includes a multiplicity of AC coefficients, respectively;

converting the transform coefficients included in the plurality of subbands into a number of assembled blocks with a predetermined identical size, each of the assembled blocks having M×M transform coefficients wherein M is a positive integer, one of the M×M transform coefficients being a DC coefficient and the remainder thereof being. AC coefficients;

generating first and second class parameters representing the activities of the DC coefficients in the horizontal and vertical directions within all of the assembled blocks;

determining and generating one or more subclasses based on the first and the second class parameters, a predetermined threshold value, and a slope factor;

generating a selection signal in response to said one or more subclasses;

encoding the DC coefficients in the assembled blocks, to thereby generate a first encoded video signal;

encoding the AC coefficients in each of the assembled blocks in response to the selection signal, to thereby produce a second encoded video signal; and formatting the first and the second encoded video signals.

2. An apparatus for encoding an input video signal, which comprises:

means for transforming the input video signal into a plurality of subbands of transform coefficients by using a discrete wavelet transform, wherein one of the subbands existing in the lowest frequency band includes one or more DC coefficients and the remainder of the subbands includes a multiplicity of AC coefficients, respectively;

means for converting the transform coefficients included in the plurality of subbands into a number of assembled blocks with a predetermined identical size, each of the assembled blocks having M×M transform coefficients wherein M is a positive integer, one of the M×M transform coefficients being a DC coefficient and the remainder thereof being AC coefficients;

means for generating first and second class parameters representing the activities of the DC coefficients in the horizontal and vertical directions within all of the assembled blocks;

means for determining and generating one or more subclasses based on the first and the second class parameters, a predetermined threshold value and a slope factor;

means for generating a selection signal in response to the subclasses;

first encoding means for encoding the DC coefficients in the assembled blocks, to thereby generate a first encoded video signal;

second encoding means, responsive to the selection signal, for encoding the AC coefficients in each of the assembled blocks, to thereby produce a second encoded video signal; and means for formatting the first and the second encoded video signals.

\* \* \* \* \*